(12) United States Patent
Defrancq

(10) Patent No.: US 7,513,529 B2
(45) Date of Patent: Apr. 7, 2009

(54) SINGLE-PIECE WEIGHT DESIGNED TO BE HITCHED TO AN AGRICULTURAL TRACTOR LIFTING DEVICE

(76) Inventor: Hubert Defrancq, 2, Rue de Laon, Guignicourt F-02190 (FR)

( * ) Notice: Subject to any disclaimer, the term of this patent is extended or adjusted under 35 U.S.C. 154(b) by 0 days.

(21) Appl. No.: 10/585,246

(22) PCT Filed: Dec. 15, 2004

(86) PCT No.: PCT/FR2004/003235

§ 371 (c)(1),
(2), (4) Date: Jun. 1, 2007

(87) PCT Pub. No.: WO2005/075283

PCT Pub. Date: Aug. 18, 2005

(65) Prior Publication Data

US 2007/0261866 A1  Nov. 15, 2007

(30) Foreign Application Priority Data

Jan. 6, 2004  (FR) .................................. 04 00059

(51) Int. Cl.
*B60S 9/00* (2006.01)
(52) U.S. Cl. ...................................... 280/759
(58) Field of Classification Search ................. 280/759, 280/758, 757; 212/195, 196; 414/673, 719; 172/611, 272
See application file for complete search history.

(56) References Cited

U.S. PATENT DOCUMENTS

| 3,888,507 | A | * | 6/1975 | Berghausen | ................. | 280/759 |
| 3,944,252 | A | * | 3/1976 | Barth | .......................... | 280/759 |
| 4,094,534 | A | * | 6/1978 | Welke et al. | ................. | 280/760 |
| 4,537,423 | A | * | 8/1985 | Nau et al. | ..................... | 280/759 |
| 6,533,319 | B1 | | 3/2003 | Denby et al. | | |
| D549,740 | S | * | 8/2007 | Teich | .......................... | D15/28 |

FOREIGN PATENT DOCUMENTS

| DE | 38 01 895 | 8/1989 |
| EP | 0 315 595 | 5/1989 |
| JP | 10-297890 | 11/1998 |

* cited by examiner

*Primary Examiner*—Faye M. Fleming
(74) *Attorney, Agent, or Firm*—Young & Thompson

(57) ABSTRACT

A single-piece tractor weight (M) comprising an upper surface (1), a base (2), two surface oriented transversely relative to the advancing direction of the tractor and two side surfaces having a transverse eye bolt or pin (7, 8) constituting an engagement element for lifting the tractor; the weight (M) includes at least one housing (L1, L2) emerging on the outside and oriented so as to receive at least one lifting branch (B1, B2) of a load handling device and to enable the weight to be lifted and handled through co-operation between the housing and the lifting branch.

17 Claims, 2 Drawing Sheets

SINGLE-PIECE WEIGHT DESIGNED TO BE HITCHED TO AN AGRICULTURAL TRACTOR LIFTING DEVICE

BACRGROUND OF THE INVENTION

1. Field of the Invention

The invention relates to a single-piece weight designed to be hitched to an agricultural tractor lifting device.

Such a weight has a top face, a bottom, two faces oriented transversely to the direction of travel of the tractor, and two side faces substantially parallel to the direction of travel, each side face comprising a transverse eye-bolt or spindle forming a means of engagement for the tractor lifting device. A third hitching point means may be provided on the top face of the weight.

2. Description of the Related Art

Thanks to the evolution of motorization means and manufacturing techniques, agricultural tractors have seen their power increase considerably without their weight increasing in the same proportions. The result of this is that the power-to-weight ratio of the tractor has substantially increased. This situation is beneficial in many cases:

for transport, it is possible to accept a greater payload;
for work on top of the ground or for work operated by the tractor power-take-off, the soil compaction is reduced if a current tractor is compared with an older tractor of the same power.

The rolling resistance is reduced, at a constant power, so that the power necessary to move the tractor is also reduced.

However, during work requiring a relatively high traction force, for example for ploughing the ground, it is necessary to effectively transmit the power into traction to prevent an excessive degree of wheel-slip on the ground that is a source of wasted energy, tyre wear and ground damage. The user then installs a weight or weights on the tractor so as to have a sufficient tractor weight/traction force ratio.

In addition, the implements hitched to the tractor are becoming bigger and therefore heavier. They have to be counterbalanced to balance the weight of the tractor and keep it stable. Therefore weights are added to the front of the tractor when the latter is fitted with a rear implement, or weights are added to the rear when the latter is fitted, for example, with a front loader.

A relatively old solution consists in providing, on the tractor, a support that can receive several weights. Each weight, individually, has an insufficient value to substantially improve the transmission of power into traction.

For some years, weights called "single-piece" weights have appeared, being in one piece or consisting of an assembly of several subassemblies forming a single block, having a sufficient value of at least 500 kg and being able to reach or exceed 1500 kg, to improve the transmission of power into traction. The number of weights to be handled is reduced, which simplifies installation, but the high value of the weight poses a handling problem.

Such a single-piece weight comprises, on each side face, a transverse eye-bolt or spindle forming an engagement means for the three-point lifting device of the tractor. Hitching the weight to the tractor is made much easier. A third hitch point may be provided on the top face of the weight to prevent an oscillating motion about the eye-bolts or side spindles.

Situations do however occur for which these single-piece weights, of a relatively high weight, must be handled in the absence of a tractor fitted with a three-point lifting device. This is the case, for example, during the manufacture of the weights, during their dispatch and during the loading and unloading phases at the distributors.

The presence of the transverse eye-bolts or spindles protruding on the side faces, or of the top third point anchoring point, however, makes it possible to hitch cables or slings to lift the weight with the aid of a normal lifting machine.

Thus, hitherto, the presence of these eye-bolts or of the top anchoring point has seemed to be a sufficient engagement means to those skilled in the art for handling the single-piece weights.

BRIEF SUMMARY OF THE INVENTION

The inventor, instead of considering this engagement means as satisfactory according to the general opinion in the prior art, has sought to make still easier the handling of such single-piece weights, particularly in the absence of a three-point lifting device, without, for all that, excessively complicating their manufacture, or substantially increasing the production cost.

According to the invention, a single-piece weight designed to be hitched to an agricultural tractor lifting device, of the kind previously defined, is characterized in that it comprises at least one housing opening outward and oriented so as to be able to receive at least one lift prong of a load-handling device and to allow the weight to be lifted and handled by interaction of this housing and the lift prong.

It thus becomes possible to directly maneuver the weight with the handling device, without having to use cables or slings.

Preferably, the housing consists of at least one recessed portion of the bottom of the weight.

This recessed portion comprises at least one groove extending from one edge of the bottom and emerging at at least one end.

Preferably, the bottom comprises two parallel grooves whose spacing is designed to allow the prongs of a fixed spacing pallet truck to pass.

The grooves usually accept a substantially inverted U cross section, open downward.

According to a variant, the grooves are provided on the bottom edges of the weight and are open laterally outward having a substantially right angle cross section.

According to another variant, the bottom may comprise a single central groove of sufficient width to receive the two prongs of the fork of the load handling device, this groove being bordered by two zones protruding downward.

The grooves may be oriented at right angles relative to the direction of the hitching eye-bolts.

As a variant, the grooves may be parallel to the direction of the hitching eye-bolts.

BRIEF DESCRIPTION OF THE DRAWINGS
FIGS.

The side faces of the weight may comprise convergent inclined portions and the grooves are open laterally outward at these inclined portions.

Apart from the dispositions explained hereinabove, the invention consists in a certain number of other dispositions that will be discussed more explicitly hereinafter in relation to exemplary embodiments that are described in detail with reference to the appended drawings, but that are in no way limiting. In these drawings.

DETAILED DESCRIPTION OF THE PREFERRED EMBODIMENTS

Figure 1:
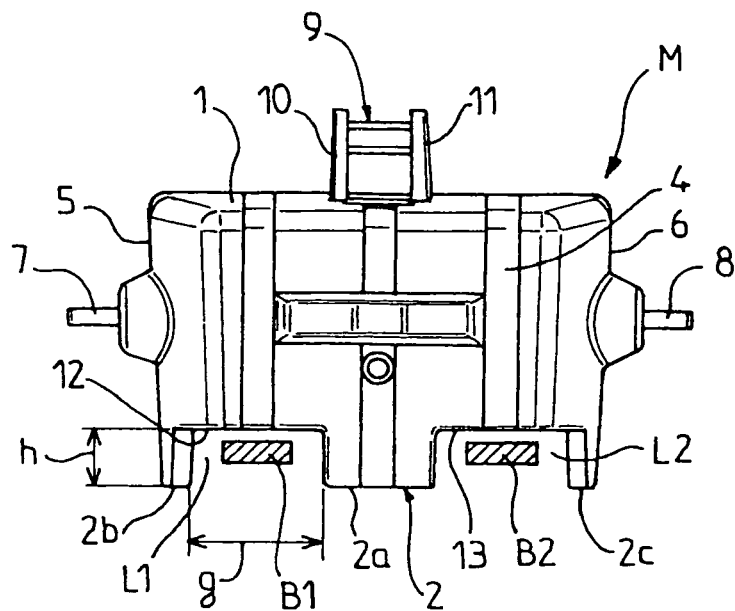
FIG. 1 is a view in elevation of the front of a single-piece weight according to the invention.
Figure 2:
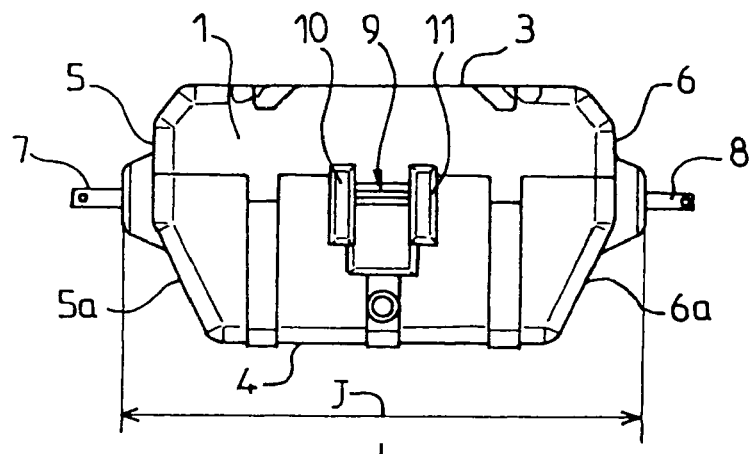
FIG. 2 is a top view relative to FIG. 1.
Figure 3:
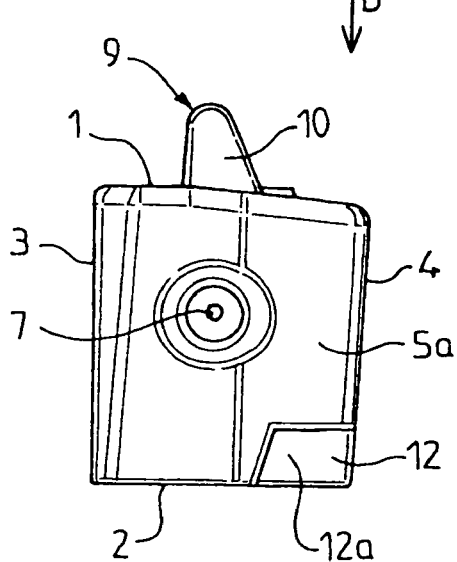
FIG. 3 is a left view relative to FIG. 1.
Figure 4:
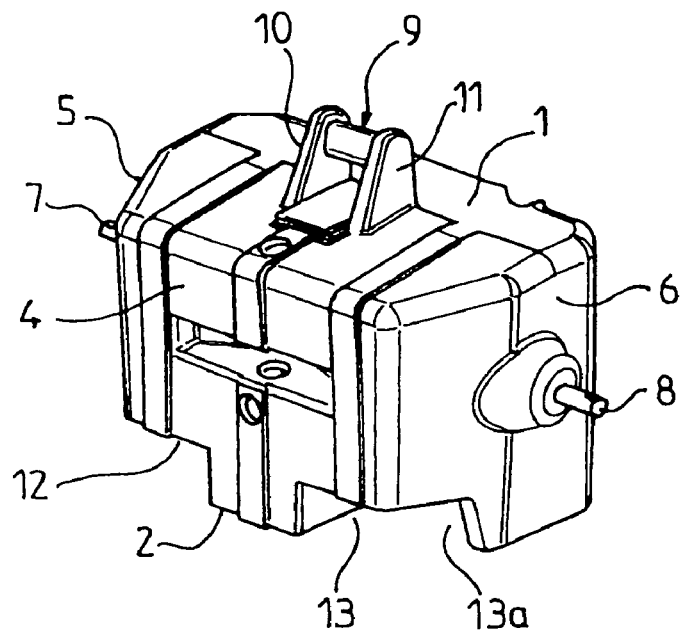
FIG. 4 is a view in perspective from the front right side of the weight of FIG. 1.

With reference to FIGS. 1 to 4 of the drawings, they show a single-piece weight M designed to be hitched to a lifting device (not shown) of the three-point type of an agricultural tractor. The weight M has a top face 1, a bottom 2, two faces 3, 4 oriented transverse to the direction of travel D of the tractor (not shown) and two side faces 5, 6 substantially parallel to the direction of travel. Overall, the weight may have substantially the shape of a rectangular parallelepiped. In the example shown, the side faces 5, 6 extend forward via convergent inclined walls 5a, 6a on the side opposite the transverse face 3 situated toward the rear.

It should be noted that the terms "front" and "rear" should be considered in a relative manner. In the example shown, the transverse face 4 is called the front face because the weight M is hitched to a tractor front hitching device, in which case the face 4 is situated first in the direction of travel D. However, if the weight M is hitched to a tractor rear lifting device, it is the transverse face 3 that is first in the direction of travel D while the transverse face 4 is turned toward the rear.

Each side face 5, 6 comprises a transverse eye-bolt or spindle 7, 8 solidly anchored in the weight and forming an engagement means for the two lower arms of the tractor lifting device. The eye-bolts 7 and 8 are aligned horizontally and perpendicularly to the direction D.

Preferably, the top face 1 comprises, in the middle, a hitching means 9 receiving the support connecting the third top middle point of the tractor lifting device. The hitching means 9 may consist of a horizontal bar anchored at each end in vertical plates 10, 11 forming part of, or being solidly attached to, the weight M.

As a variant, particularly with weights of the order of 1200 kg or more, to prevent too great a longitudinal overhang, the weight may be enlarged forward while retaining, at the eye-bolts 7, 8 and at the rear, a sufficiently reduced width to pass between lift arms of the lifting device.

The weight M, according to FIGS. 1 to 4, comprises two horizontal housings L1, L2 opening to the outside and designed to receive the lift prongs B1, B2 of a fork of a load-handling device (not shown). The prongs B1, B2, by interacting with the top horizontal wall of each housing, make it possible to lift and move the weight. According to FIGS. 1 to 4, the two housings L1, L2 consist respectively of a recessed portion of the bottom 2. Each recessed portion consists of a groove 12, 13 extending from one edge of the bottom to the opposite edge, open downward and opening at each end. Preferably the grooves 12, 13 are at right angles relative to the direction of the hitching eye-bolts 7, 8. The spacing of the grooves 12, 13 parallel to the eye-bolts 7, 8 is chosen to allow the prongs B1, B2 of a fixed spacing pallet truck fork to be inserted into these grooves. The width g of the grooves is chosen to make it easy to insert the prongs B1, B2 and to make it easier to use lift trucks with an adjustable width fork.

The solution with two grooves 12, 13 makes it possible to have, on the bottom 2, three zones of contact 2a, 2b, 2c with the ground, which makes it possible to ensure stability and limit the risks of sinking into the ground.

It should be noted that the grooves 12, 13 are open laterally outward at 12a, 13a due to the inclination of the portions 5a, 6a of the side faces of the weight. These openings 12a, 13a make it easier to engage the prongs B1, B2 in the grooves.

The height h of the grooves 12 and 13 is markedly greater than the thickness of the prongs B1, B2 of the fork. This height h is preferably greater than 10 cm.

Figure 5:
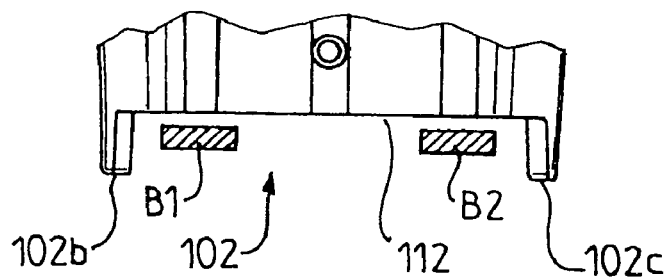
FIG. 5 shows, like FIG. 1, a variant of the bottom portion of the weight.

FIG. 5 illustrates a variant embodiment according to which the bottom 102 comprises a single recessed portion formed by a groove 112 whose width is sufficient to receive the two prongs B1, B2. The groove 112 is bordered, on each side, by protruding portions 102b, 102c that come into contact with the ground.

Figure 6:
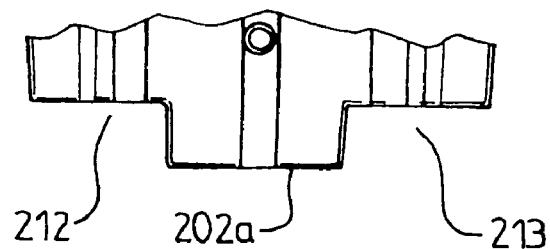
FIG. 6 shows, like FIG. 5, another variant of the bottom portion.

FIG. 6 shows another variant embodiment according to which the bottom 202 of the weight comprises a recessed portion 212, 213 on each of its longitudinal edges, these recessed portions having a right angle cross section open outward. The bottom thus comprises a central protuberance that determines the zone of contact 202a with the ground.

According to a variant not shown, it is possible to produce the recessed portions consisting of the grooves 12, 13, 112, 212 and 213 in a direction parallel to that of the eye-bolts 7, 8, that is to say orthogonal to the direction D of travel.

According to another possibility, two systems of orthogonal grooves could be provided in the bottom of the weight, a first system of grooves orthogonal to the direction of the eye-bolts 7 and 8 as illustrated in FIGS. 1 to 4, and a second system of grooves parallel to the direction of the eye-bolts 7 and 8. Such a solution makes it possible to increase the possibilities of coming close to the weight M with a handling machine, which makes the operations aimed at moving the weight easier.

The total surface area of the bottom in contact with the ground, that is to say the total surface area of the zones 2a, 2b, 2c in the example of FIGS. 1 to 4, or the total surface area of the zones 102b, 102c (FIG. 5) or of the zone 202 (FIG. 6), is chosen so that the pressure exerted on the ground is sufficiently low to prevent considerable sinkage into soft ground. This pressure is preferably at most equal to $2.10^5$ Pa.

The width J of the weight M from the hitching eye-bolts 7, 8 to the face 3 is limited so as to fit between the lower arms of a tractor three-point lifting device, in order to limit the longitudinal overhang.

In the examples described hereinabove, the housings L1, L2 open downward. As a variant, these horizontal housings could comprise a bottom wall and have a straight cross section with a closed rectangular contour. A weight M according to the invention may be handled easily with the aid of a pallet truck or a fork lift truck.

While remaining within the scope of the invention, it is possible to produce a single-piece weight by assembling several subassemblies thereby forming a single block. This makes it possible to produce single-piece weights of variable weight by assembling individual modules.

The invention claimed is:

1. A single-piece weight (M) to be hitched to an agricultural tractor lifting device, comprising:
   a top face;
   a bottom;
   two faces oriented transverse to the direction of travel of the tractor;
   two side faces substantially parallel to the direction of travel, each side face comprising a transverse eyebolt or spindle (7, 8) forming a means of engagement for the tractor lifting device; and
   at least one housing (L1, L2) opening outward and oriented so as to be able to receive at least one lift prong (B1, B2) of a load-handling device and to allow the weight to be lifted and handled by interaction of this housing and the lift prong, the housing (L1, L2) comprising at least one recessed portion (12, 13; 112; 212, 213) of the bottom of the weight, the recessed portion comprising at least one groove (12, 13; 112; 212, 213) extending from one edge of the bottom and emerging at at least one end.

2. The weight as claimed in claim 1, wherein the bottom comprises the two parallel grooves (12, 13) whose spacing is designed to allow the prongs of a fixed spacing pallet truck to pass.

3. The weight as claimed in claim 1, wherein the grooves (12, 13; 112) accept a substantially inverted U cross section, open downward.

4. A single piece weight (M) to be hitched to an agricultural tractor lifting device, comprising:
- a top face;
- a bottom;
- two faces oriented transverse to the direction of travel of the tractor;
- two side faces substantially parallel to the direction of travel, each side face comprising a transverse eye-bolt or spindle (7, 8) forming a means of engagement for the tractor lifting device; and
- at least one housing (L1, L2) opening outward and oriented so as to be able to receive at least one lift prong (B1, B2) of a load-handling device and to allow the weight to be lifted and handled by interaction of this housing and the lift prong, the noosing (L1, L2) comprising at least one recessed portion (12, 13; 112; 212 213) of the bottom of the weight, the recessed portion comprising at least one groove (12, 13; 112; 212, 213) extending from one edge of the bottom and emerging at least one end,
- wherein the grooves (212, 213) are provided on the bottom edges of the weight and are open laterally outward having a substantially right angle cross section.

5. The weight as claimed in claim 1, wherein the bottom comprises a single center groove (112) of sufficient width to receive the two prongs of the fork of the load-handling device, the single central groove (112) being bordered by two zones (102b, 102c) protruding downward.

6. A single-piece weight (M) to be hitched to an agricultural tractor lifting device, comprising:
- a top face;
- a bottom;
- two faces oriented transverse to the direction of travel of the tractor;
- two side faces substantially parallel to the direction of travel, each side face comprising a transverse eye-bolt or spindle (7, 8) forming a means of engagement for the tractor lifting device; and
- at least one housing (L1, L2) opening outward and oriented so as to be able to receive at least one lift prong (BT, B2) of a load-handling device and to allow the weight to be lifted and handled by interaction of this housing and the lift prong, the housing (L1, L2) comprising at least one recessed portion (12, 13; 112; 212, 213) of the bottom of the weight, the recessed portion comprising at least one groove (12, 13; 112; 212, 213) extending from one edge of the bottom and emerging at least one end,
- wherein the grooves (12, 13; 112; 212, 213) are oriented at right angles relative to the direction of the hitching eye-bolts (7, 8).

7. The weight as claimed in one of claim 1, wherein the grooves are parallel to the direction of the hitching eye-bolts (7, 8).

8. The weight as claimed in claim 6, wherein the side faces (5, 6) of the weight comprise convergent inclined portions (5a, 6a) and in that the grooves (12, 13) are open laterally outward (12a, 13a) at these inclined portions (5a, 6a).

9. The weight as claimed in claim 2, wherein the grooves (12, 13; 112) accept a substantially inverted U cross section, open downward.

10. A single piece weight (M) to be hitched to an agricultural tractor lifting device, comprising:
- a top face,
- a bottom;
- two faces oriented transverse to the direction of travel of the tractor;
- two side faces substantially parallel to the direction of travel, each side face comprising a transverse eye-bolt or spindle (7, 8) forming a means of engagement for the tractor lifting device; and
- at least one housing (L1, L2) opening outward and oriented so as to be able to receive at least one lift prong (B1, B2) of a load-handling device and to allow the weight to be lifted and handled by interaction of this housing and the lift prong, the housing (L1, L2) comprising at least one recessed portion (12, 13; 112; 212, 213) of the bottom of the weight, the recessed portion comprising at least one groove (12, 13; 12; 212, 213) extending from one edge of the bottom and emerging at least one end,
- wherein the bottom comprises the two parallel grooves (12, 13) whose spacing is designed to allow rho prongs of a fixed spacing pallet truck to pass, and the grooves (12, 13; 112; 212, 213) are oriented at right angles relative to the direction of the hitching eyebolts (7, 8).

11. The weight as claimed in claim 3, wherein the grooves (12, 13; 112; 212, 213) are oriented at right angles relative to the direction of the hitching eye-bolts (7, 8).

12. The weight as claimed in claim 4, wherein the grooves (12, 13; 112; 212, 213) are oriented at right angles relative to the direction of the hitching eyebolts (7, 8).

13. The weight as claimed in claim 5, wherein the grooves (12, 13; 112; 212, 213) are oriented at right angles relative to the direction of the hitching eye-bolts (7, 8).

14. The weight as claimed in claim 2, wherein the grooves are parallel to the direction of the hitching eye-bolts (7, 8).

15. The weight as claimed in claim 3, wherein the grooves are parallel to the direction of the hitching eye-bolts (7, 8).

16. The weight as claimed in claim 4, wherein the grooves are parallel to the direction of the hitching eye-bolts (7, 8).

17. A single-piece weight (M) to be hitched to an agricultural tractor lifting device, comprising:
- a top face;
- a bottom;
- two faces oriented transverse to the direction of travel of the tractor;
- two side faces substantially parallel to the direction of travel, each side face comprising a transverse eye-bolt or spindle (7, 8) forming a means of engagement for the tractor lifting device; and
- at least one housing (L1, L2) opening outward and oriented so as to be able to receive at least one lift prong (B1, B2) of a load-handling device and to allow the weight to be lifted and handled by interaction of this housing and the lift prong, the housing (L1, L2) comprising at least one recessed portion (12, 13; 112; 212, 213) of the bottom of the weight, the recessed portion comprising at least one groove (12, 13; 112; 212, 213) extending from one edge of the bottom and emerging at least one end,
- wherein the bottom comprises a single central groove (112) of sufficient width to receive the two prongs of the fork of the load-handling device, the sin le central groove (112) being bordered by two zones (102b, 102c) protruding downward, and the grooves are parallel to the direction of the hitching eye-bolts (7, 8).

* * * * *